TRIANGULAR WAVE GENERATOR

Original Filed June 9, 1959 3 Sheets-Sheet 1

Aug. 7, 1962 E. A. HENRY 3,048,795

TRIANGULAR WAVE GENERATOR

Original Filed June 9, 1959 3 Sheets-Sheet 3

United States Patent Office 3,048,795

Patented Aug. 7, 1962

3,048,795
TRIANGULAR WAVE GENERATOR

Elliott A. Henry, Newtown, Conn., assignor to Branson Instruments, Inc., Stamford, Conn.

Original application June 9, 1959, Ser. No. 819,042. Divided and this application Dec. 6, 1960, Ser. No. 74,122
6 Claims. (Cl. 331—152)

This invention relates to an improved triangular wave generator. More specifically, it relates to a controlled relaxation oscillator for generating a linear pyramid or triangular waveform. The durations of the rise and decay portions of the wave are readily adjustable over a range including a symmetrical waveform.

This application is a division of my copending application Serial No. 819,042, filed June 9, 1959.

Linear pyramid waves, i.e. waves having a linear increase and decrease of the voltage, are highly useful in electronic measurement apparatus. For example, in one such application, described below, they are used in accurately locating an ultrasonically detected defect in an elongated member. This application requires that the waves be symmetrical, i.e. have equal rise and decay periods.

In general there are considerable data in the literature on the subject of pyramid waves, described as non-sinusoidal waves having equal and linear rise and decay times, being used as classical examples for wave analysis, but practically no data exist in the literature on the generation of such waveforms. In current practice, pyramid wave forms are approximated by integration of square waves, but such techniques can never produce linear rise and decay times; both rise and decay will always have an exponential form differing only in degree by the amount of integration, and if the integration is carried to a sufficient degree the resultant wave will be a sine wave having the fundamental frequency of the square wave. The integration technique for approximating pyramid waves suffers a further serious disadvantage where a wide range of frequencies are required, as the time constant of the integration network must be continually adjusted to correspond to the period of the wave, for a uniform approximation.

It is a principal object of my invention to provide a pyramid wave generator characterized by equal and linear rise and decay periods.

It is a further object to provide a pyramid wave generator characterized by equal and linear rise and decay periods wherein the frequency may be varied over wide limits, of the order of ten thousand or more to one, while maintaining the equal and linear rise and decay of each cycle.

It is yet a further object to provide a pyramid wave generator as described above having a very low equivalent generator impedance with the amplitude of the output wave essentially independent of the load between the limits of no load and full load.

It is a still further object to provide a pyramid wave generator as described above which may be activated and deactivated at predetemined times by application of a gating wave and wherein all of the cycles of oscillation will have equal amplitude.

Other objects of the invention will in part be obvious and will in part appear hereinafter.

The invention accordingly comprises the features of construction, combination of elements, and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawings in which.

As disclosed in the above mentioned copending application, Serial No. 819,042, the present invention may be used in apparatus which locates internal defects or flaws, in a body or mechanical part having relatively parallel opposing surfaces, by detecting the reflections of transverse vibrational wave trains. In general, the flaw detector employs a cathode ray tube display system in which the path of the baseline trace represents the path of an acoustic wave through such a test body under inspection. The inspection apparatus includes means for producing time marks having equal and linear periods of rise and decay whereby a substantially equilateral pyramidal wave form is imparted to the cathode ray baseline display. Echo signals produced by internal reflections of acoustic waves are then superimposed upon this pyramidal base to display the exact locations of the discontinuities causing such reflections.

Figure 1:
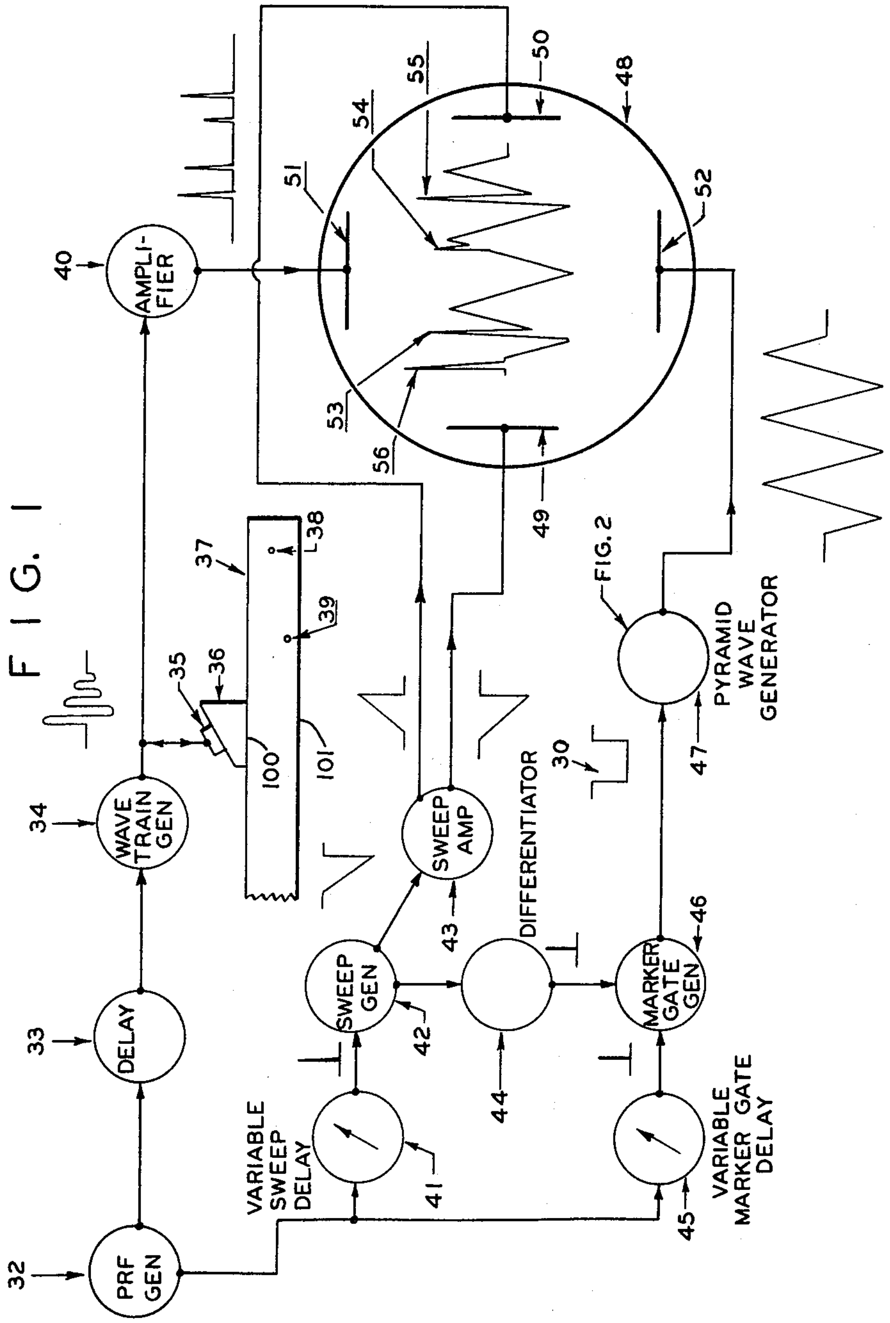
FIGURE 1 is a block diagram of apparatus for ultrasonic flaw detection incorporating a pyramid wave generator embodying my invention.
Figures 2, 3:
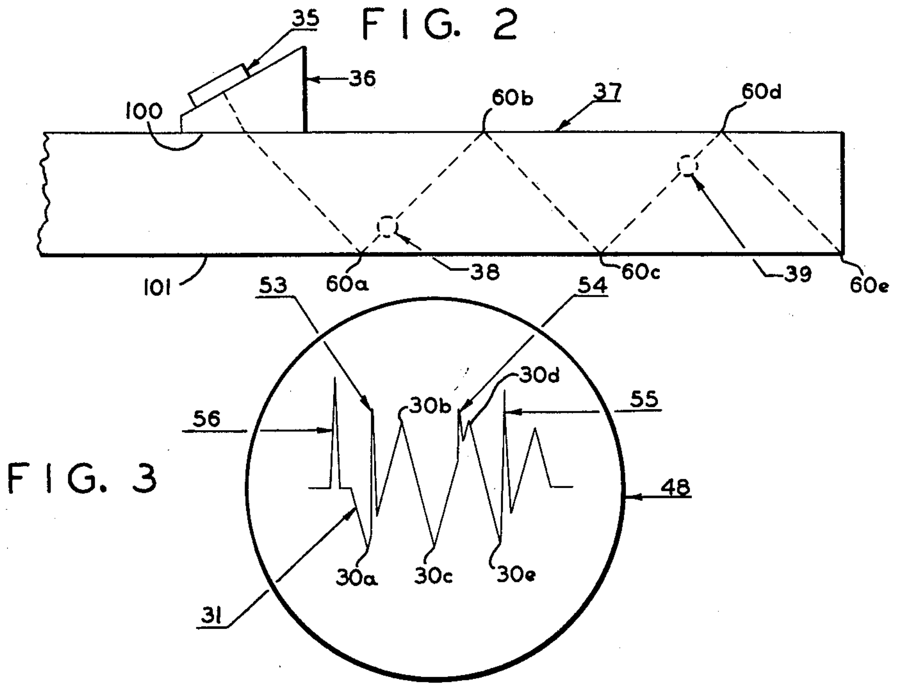
FIGURE 2 is a physical diagram illustrating the path of a transverse vibrational wave through a test sepcimen with parallel opposing surfaces.
FIGURE 3 illustrates the pattern displayed on the face of a cathode ray tube with the test specimen of FIGURE 2 and the instrumentation represented in FIGURE 1.

Referring now in greater detail to FIGURE 1, there is shown a pulse repetition rate generator 32, commonly called a clock or synchronizer, which provides the timing signals for the system. These timing signals are coupled to three delay multivibrators, pulse delay 33, sweep delay 41 and marker gate delay 45. The pulse delay multivibrator 33 preferably provides a delay of 20 to 25 microseconds to permit the sweep and marker gate to be activated prior to the initial pulse, if desired. The delayed trigger from the pulse delay 33 is coupled to a wave train generator or pulser 34 which generates a high-frequency electrical wave train that is applied to a piezoelectric crystal 35. The piezoelectric crystal converts the electrical wave train into corresponding mechanical vibrations, and these longitudinal vibrations are transmitted through a plastic wedge 36 and through a suitable couplant such as oil or cement into a test body such as 37 (FIG. 1 and FIG. 2). The wedge 36 may preferably of Lucite, although other plastic materials may be used. With a suitable wedge angle, which is approximately 32 degrees if the plastic wedge 36 is formed of Lucite, the longitudinal vibrations will be converted to transverse vibrations at the interface 100 between the Lucite wedge 36 and the entrant surface of the test body 37. Again a suitable couplant such as oil is required at the interface 100.

Referring now to FIGURE 2, in the test specimen 37, two defects or internal flaws are shown at 38 and 39. As is well known in the art, the transverse vibrational wave will propagate into the body 37 at an angle of approximately 45 degrees with respect to the entrant surface 100 as shown by the broken line 60 in FIGURE 2, and upon encountering the opposite boundary 101 of the body 37 will be deflected at the same angle of incidence, as shown at **60*a* in FIGURE 2. Any reflection from an internal discontinuity, such as flaw 38, lying in the path of the ultrasonic beam 60 will be reflected back over the same path to the piezoelectric crystal 35, through the wedge 36, and the transverse wave reflection will be converted to longitudinal vibrations at the interface 100 of the part 37 and the wedge 36. As illustrated in FIGURE 2, the broken line 60 represents the center line or axis of the beam of ultrasonic wave energy introduced into the test piece 37, and it is to be understood that this beam has a substantial cross-sectional area, which approximately corresponds to the active surface area of the piezoelectric transducer 35. Because the beam 60 is larger than the flaw 38, a substantial portion of the ultrasound passes around flaw 38 and is deflected from the upper surface boundary at 60***b* downward at an angle to the lower surface where it is again deflected upwardly at 60*c*. Between the deflection points 60*c* and 60*d* the beam encounters the second flaw 39 from which a portion of the energy is reflected back over the same path to the transducer 35.

The crystal transducer 35 converts the mechanical vibrations into electrical vibrations and these are in turn coupled to the echo amplifier 40 (FIGURE 1). The echo wave trains are amplified, converted into uni-directional impulses and further amplified in the amplifier 40 and then coupled to one of the vertical deflecting plates 51 of the cathode ray tube indicator 48, as shown in FIGURE 1.

Referring again to FIGURE 1, the cathode ray tube sweep is initiated coincident with the initial pulse by adjustment of the delay multivibrator 41 whose output trigger initiates the sweep generator 42 which generates a linear sawtooth of voltage. A negative going sawtooth is preferred, as will be explained hereafter. The sawtooth sweep voltage from generator 42 is amplified in a push pull amplifier 43 and applied to the horizontal deflecting plates 49 and 50 of the cathode ray tube 48.

The marker gate generator 46 may be a monostable multivibrator with the quasi-stable state adjusted for a period just slightly longer than the maximum period of the sweep generated by the sweep generator 42. This will insure the return of the marker gate generator 46 to the stable state prior to the subsequent initiating trigger from the delay multivibrator 45. The pyramid wave generator 47 is activated by the gate wave 30 and deactivated at the end of the sweep by a trigger derived from differentiation of the negative going sweep waveform by the differentiating network 44. This trigger restores the marker gate generator 46 to its stable state, terminating the gate signal. The pyramid wave is applied to the other vertical deflecting plate 52 of the cathode ray display tube 48. Thus the cathode ray beam of display tube 48 is deflected vertically, as viewed in FIGURE 1, by both the pyramid wave signal from generator 47 and by the amplified echo signals from amplifier 40, the latter being superimposed upon the former at time intervals corresponding to the acoustical propagation periods of ultrasound echos within the test body.

The advantage of the pyramid wave marker is illustrated by comparing FIGURE 2, showing the ultrasonic beam path through a test piece 37 and internal flaws or defects 38 and 39, with FIGURE 3 which illustrates the corresponding pattern displayed on the face of the cathode ray tube 48. Referring in particular to FIGURE 3, the points 30*a* through 30*e* at which the display trace 31 changes direction, correspond respectively to the ultrasonic beam deflection points 60*a* through 60*e* in FIGURE 2. The initial pulse 56 precedes the first cycle of the pyramid wave 31 by an amount corresponding to the transit time through the wedge 36 (FIGURE 2) and the delay period is controlled by the delay multivibrator 45 (FIGURE 1). Echo signal 53 in FIGURE 3 corresponds to defect 38 in FIGURE 2, echo 54 to defect 39 and echo 55 to the bottom right hand corner of the test part 37. The relative positions of the echo signal displays 53 and 54 on the sloping portions of the pyramid wave trace 31 correspond to the locations of the internal flaws 38 and 39 in test piece 37, indicating both the distances of each flaw from the opposite parallel surfaces 100 and 101, as well as the longitudinal (or horizontal) separation between the flaws and their respective distances from the end of the test piece 37 which is shown by the display of echo signal 55. By decreasing the sweep speed, the cathode ray tube 48 is enabled to display in a small space signals corresponding to the travel path of ultrasonic waves through test bodies of very substantial length.

Figure 4:
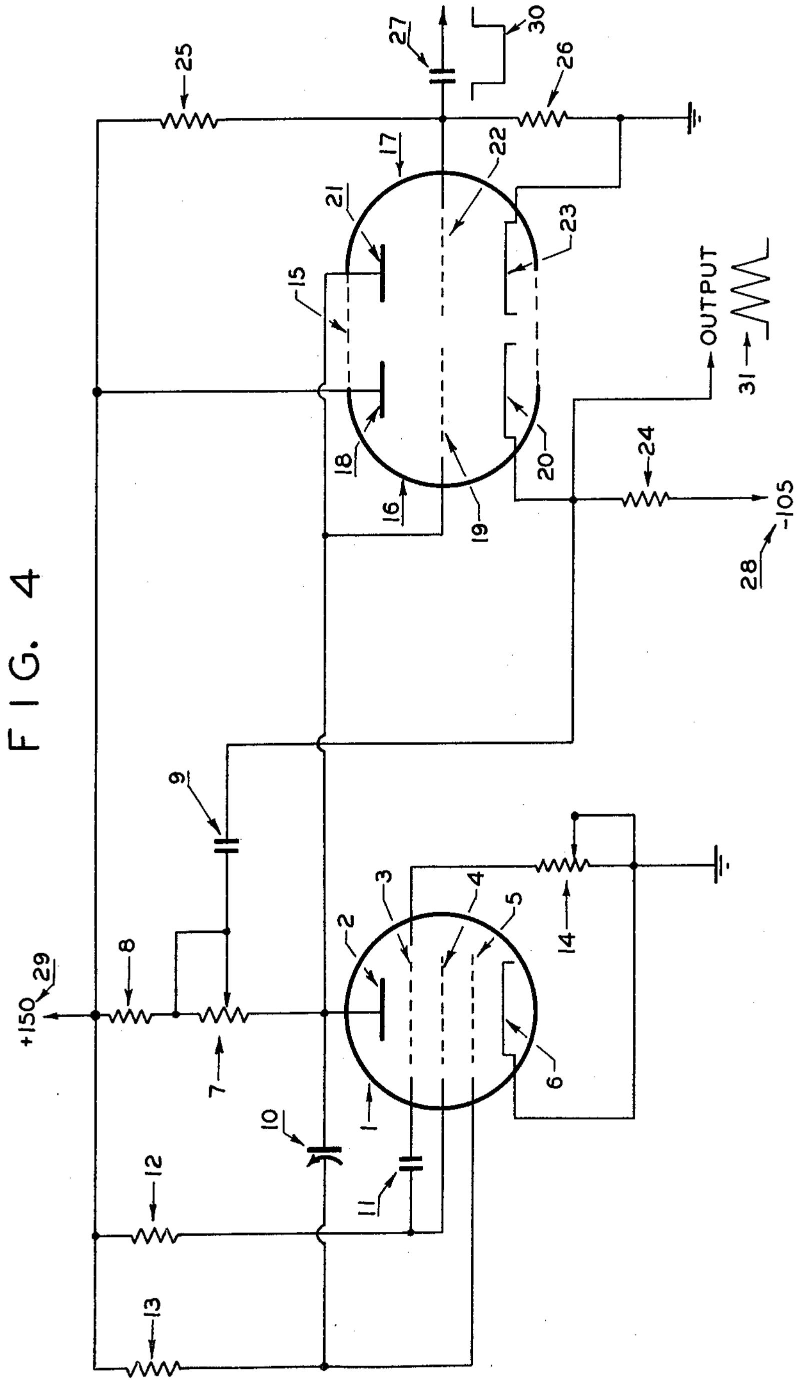
FIGURE 4 is a schematic wiring diagram of the gated pyramid wave generator embodying my invention.

The pyramid wave generator 47 in FIGURE 1 will be described in detail hereinafter with particular reference to FIGURE 4 of the drawings. The generator of FIGURE 4 is characterized by equal and linear rise and decay times and operable over a wide frequency range (ten thousand or more to one). It will be evident to those skilled in the art that if tube 17 is deleted, the gated feature will be omitted and the generator of FIGURE 4 will produce continuous waves. Basically the circuit of FIGURE 4 may be described as a free running phantastron relaxation oscillator with a bootstrapped recharge of the timing capacitor 10 providing a linear rise in the plate voltage of tube 1 in place of the exponential rise normal to the basic circuit. Gating is accomplished by holding the potential at anode 2 of tube 1 at essentially ground potential in the quiescent period, making in addition the oscillator coherent for the quasi-stable state. Referring further to FIGURE 4, in the quiescent state the grid 22 of tube 17 is maintained at ground potential by the grid to cathode conduction between grid 22 and cathode 23, this grid 22 being normally at plus ten volts. The anode 21 of tube 17 is connected to the anode 2 of tube 1, and tube 17 is heavily conducting, maintaining both anodes at approximately plus five volts, which is insufficient to allow tube 1 and associate components to oscillate. At this time the screen grid 4 of tube 1 is conducting heavily thereby assisting in maintaining the low potential at anode 2. When the gate signal 30 arrives at grid 22, tube 17 is cut off and the voltage at anode 2 of tube 1 begins to rise.

Still referring to FIGURE 4, the grid 19 of tube 16, which operates as a cathode follower, is directly connected to anode 2 of tube 1. As potential at cathode 20 of tube 16 rises, the rising voltage is coupled to the junction of resistors 7 and 8 through capacitor 9, thereby effectively increasing the supply potential to anode 2, thus producing a linear rate of rise of the anode potential on tube 1, and the recharge of capacitor 10. During this time of potential build-up the cathode current of tube 1 is diverted to the screen grid 4, until a critical anode voltage is attained. The critical anode voltage for tube 1 is established by the value of resistor 14 connected between the "number three" grid 3 and ground, the lower the magnitude of resistor 14 the lower the critical anode potential. At this critical voltage, anode 2 of tube 1 begins to draw current and the screen grid 4 current is reduced; the voltage at anode 2 then begins to fall and this potential drop is coupled to the control grid 5 through the timing capacitor 10. This 100% negative feedback coupling between anode 2 and control grid 5 produces a linear drop in the anode potential, and the rate of anode potential drop is proportional to the time constant of capacitor 10 and resistor 13.

When the voltage on anode 2 of tube 1 is within a few volts above ground potential (of the order of 3 to 5 volts), the anode current is then cut-off and the cathode current is transferred to the screen grid 4. The anode potential of tube 1 then begins to rise at a linear rate, a result of the bootstrapping previously described. The rate of rise is controlled by the time constant of capacitor 10 and resistor 7. It will be apparent that the anode supply potential to the tube 1 will be constantly reduced during the negative run-down of the anode 2 potential by the bootstrapping action of tube 16 and associated components just as it is increased during the recharge period. This requires that resistor 13 have a greater magnitude than resistor 7, to equalize the rise and decay times of the potential on anode 2. The two periods may be readily equalized by providing an adjustable resistor as shown in FIGURE 4 for resistor 7. In practice it has been found that the value of the anode resistor 7 will be approximately one half the value of the control grid resistor 13. Once the value of resistor 7 has been adjusted, the frequency may be varied by changing the value of capacitor 10 without altering the pyramid wave shape, as capacitor 10 is common to both networks controlling the rise and decay characteristics of the anode 2 potential.

The time constant of capacitor 11 and resistor 14 must be long with respect to the period of the gate wave to permit all cycles of the gated pyramid wave to have equal amplitude, and as resistor 14 is adjusted to control the critical anode 2 voltage and may have a low value, such as one thousand ohms, capacitor 11 must be large, for example ten microfarads.

Figure 5:
FIGURES 5, 6 and 7 illustrate important waveforms applied to and/or obtained from the gated pyramid wave generator of FIGURE 4.
Figure 6:
Figure 7:

FIGURE 5 illustrates the gate wave form 30 which is applied to grid 22 through capacitor 27, in FIGURE 4. FIGURE 6 illustrates the gated pyramid output wave 31 from the cathode 20 of the cathode follower tube 16, at low frequency; and FIGURE 7 illustrates the form of pyramid wave output at a higher frequency. The low equivalent generator impedance of the cathode follower 16 provides the low output impedance and makes the amplitude of the output wave independent of the load impedance for any load between infinity and approximately 250 ohms.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention which, as a matter of language, might be said to fall therebetween.

Having described my invention, what I claim as new and desire to secure by Letters Patent is:

1. An electronic generator for generating a pyramid wave form comprising, in combination, a pentode electron control device connected in a feedback circuit as a free-running phantastron relaxation oscillator, a cathode follower having its control element connected to the anode of said pentode and its cathode connected through a first capacitance and resistance to said anode, whereby the anode potential of said pentode is caused to rise at a constant rate to a critical value at which anode current commences to flow through said pentode and the anode potential thereof decreases, and a second capacitance connected between said anode of said pentode and the control grid of said pentode, whereby the decrease in anode potential is maintained at a constant rate.

2. The combination of claim 1 including an adjustable resistance in series with said first capacitance, whereby the respective rates of increase and decrease of anode potential of said pentode may be equalized to produce a substantially equilateral wave form.

3. A pyramid time mark generator comprising, in combination, a pentode electron control device connected in a feedback circuit as a free running phantastron relaxation oscillator, a second electron control device having its anode connected to the anode of said pentode and its control element biased to establish substantial anode current therethrough, whereby the anode potential of said pentode is reduced to a value insufficient to maintain oscillation therein, a cathode follower having its control element connected to the junction of said first and second anodes and its cathode connected through a capacitance and resistance to said anodes, whereby the anode potential of said pentode is caused to rise at a constant rate to a critical value at which anode current commences to flow through said pentode and the anode potential thereof decreases, and a second capacitance connected between said anodes and the control grid of said pentode, whereby the decrease in anode potential is maintained at a constant rate.

4. The combination of claim 3 including an adjustable resistance in series with said first capacitance, whereby the respective rates of increase and decrease of anode potential may be equalized to produce a substantially equilateral waveform.

5. A continuous wave generator of coherent pyramidal wave forms having equal linear rise and decay, comprising in combination, a first electron control device having an anode, a cathode, a control grid, a screen grid and a suppressor grid; a second electron control device comprising a cathode follower having an anode, cathode and control element; means applying a first positive potential to the anode of said first electron control device, means for applying lesser potentials to said suppressor and screen grids thereof, a pair of resistors in series between said first positive potential means and the anode of said first electron control device, a capacitor coupling the junction between said series resistors with the cathode of said second electron control device whereby the potential applied to the anode of said first device is increased as the potential at the cathode of said second device rises, a second capacitor coupling the anode of said first electron control device with the control grid thereof whereby changes in said anode potential are fed back to said control grid to produce continuous oscillations of current between the anode and cathode of said first discharge device, a further capacitor connecting the suppressor and screen grids of said first electron discharge device, and an adjustable resistor connecting the suppressor grid of said first electron discharge device with the cathode thereof whereby a critical value of anode voltage is established to initiate the flow of anode current through said first electron discharge device, said initiation of anode current reducing the flow of current through said screen grid and causing the potential at said anode potential to drop at a constant linear rate determined by the capacitance of said second capacitor.

6. The combination of claim 5 including a third discharge device having its anode connected in parallel with the anode of said first electron discharge device and its control element coupled to a gating signal source whereby operation of said continuous wave generator may be initiated and interrupted at will for periods of duration determined by the time duration of applied gating signals, said third electron discharge device effectively short circuiting the anode of said first discharge device substantially to ground potential in the absence of applied gating signals, whereby each cycle of pyramidal wave generated by said first electron discharge device is of equal amplitude and similar polarity to all other cycles generated thereby in response to said gating signals regardless of the timing or duration of applied gating signals.

No references cited.